Figure 1:
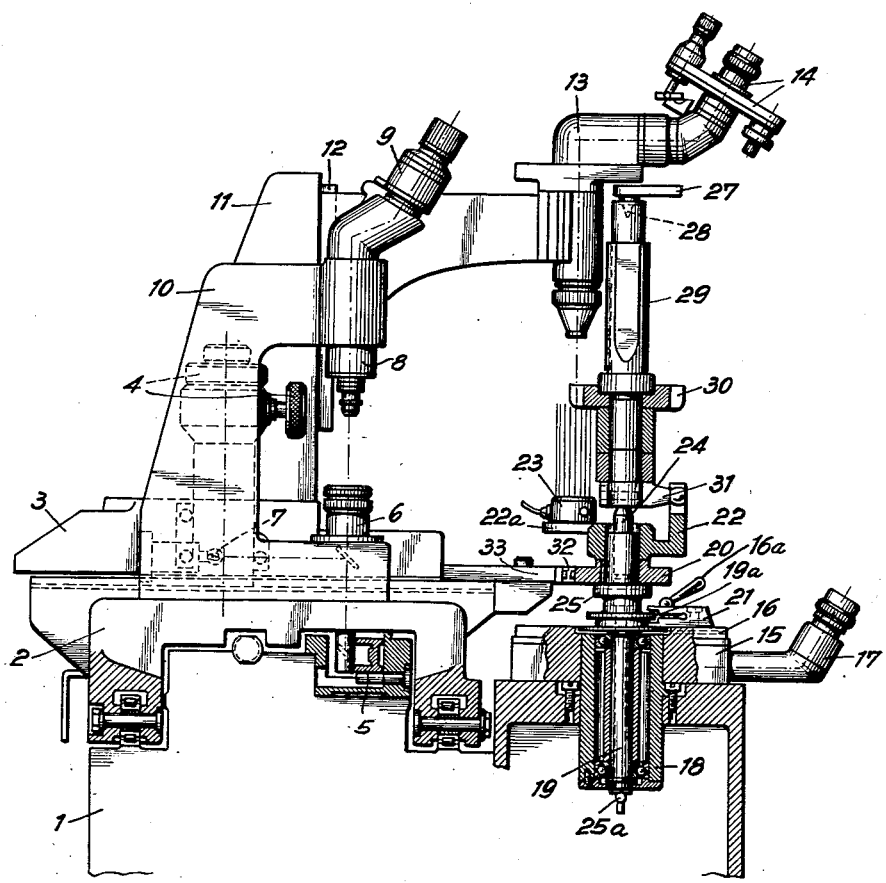

June 25, 1957 M. OESTERHELD 2,796,672
APPARATUS FOR TESTING COGWHEELS, CUTTING WHEELS, OR
SIMILAR WHEELS AND MORE
Filed June 10, 1952 12 Sheets-Sheet 1

INVENTOR
Max Oesterheld
By E. J. Freeman
his Agents

INVENTOR:
MAX OESTERHELD,
BY
his Agents

June 25, 1957 M. OESTERHELD 2,796,672
APPARATUS FOR TESTING COGWHEELS, CUTTING WHEELS, OR
SIMILAR WHEELS AND MORE
Filed June 10, 1952
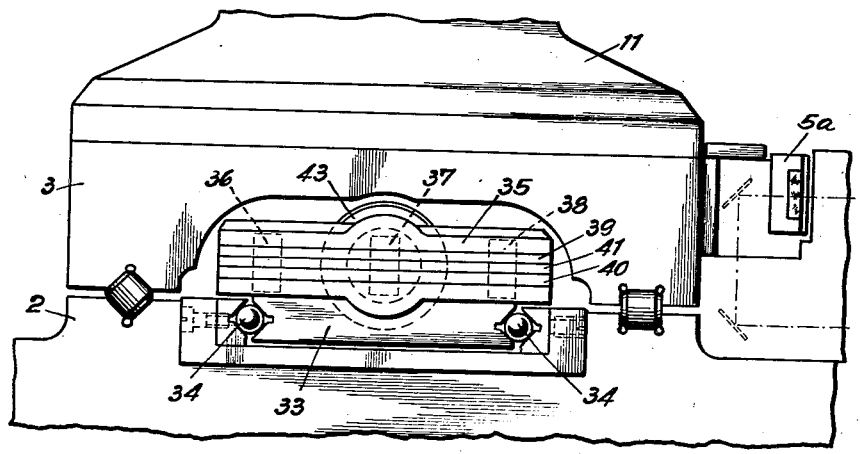
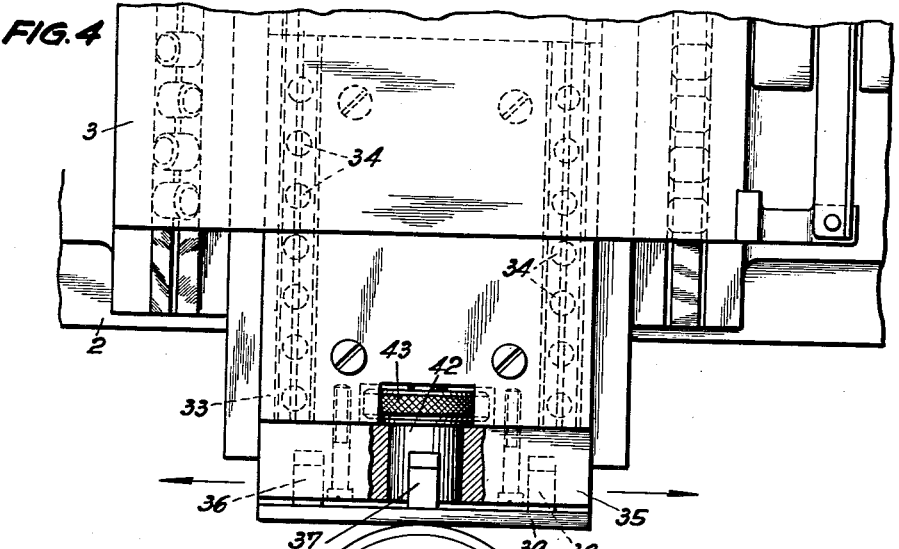
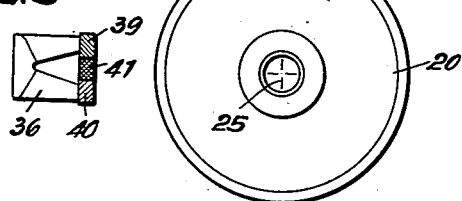
INVENTOR
Max Oesterheld
By E. J. Freeman
his Agents

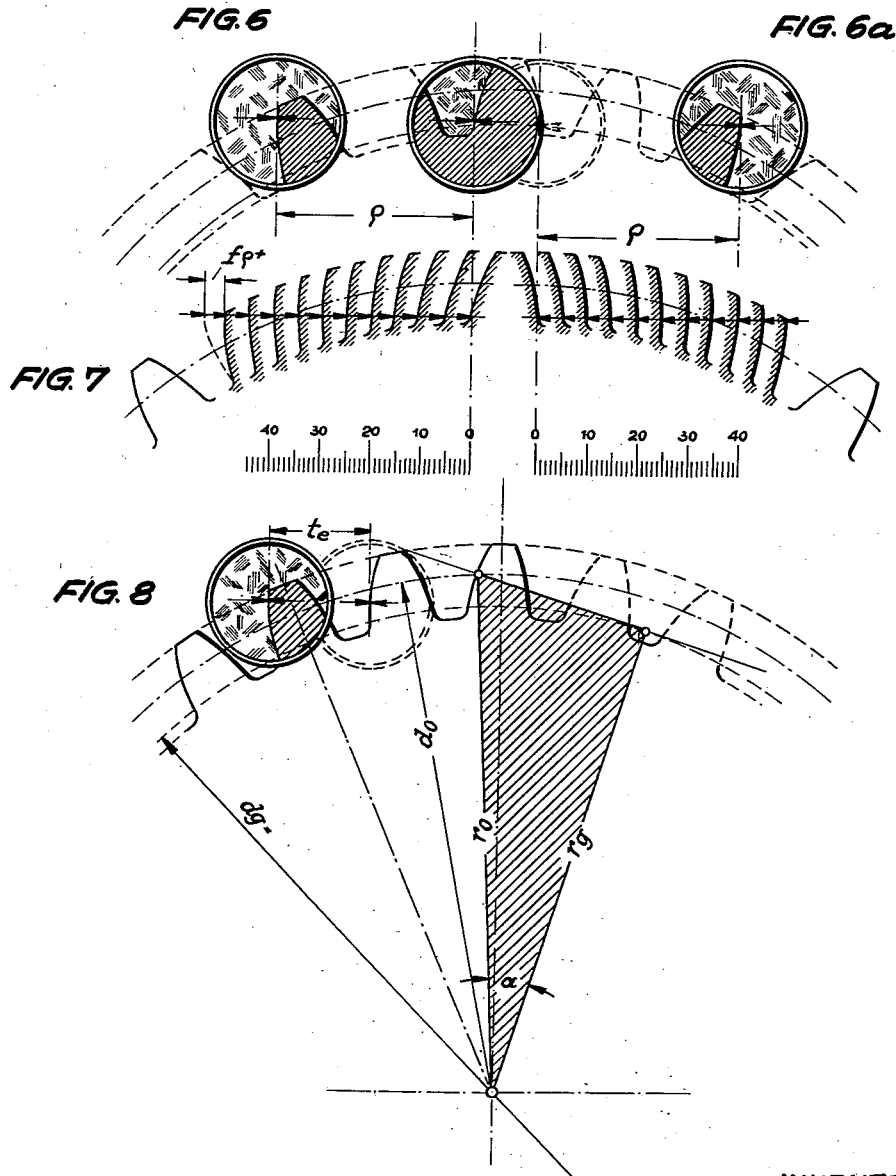

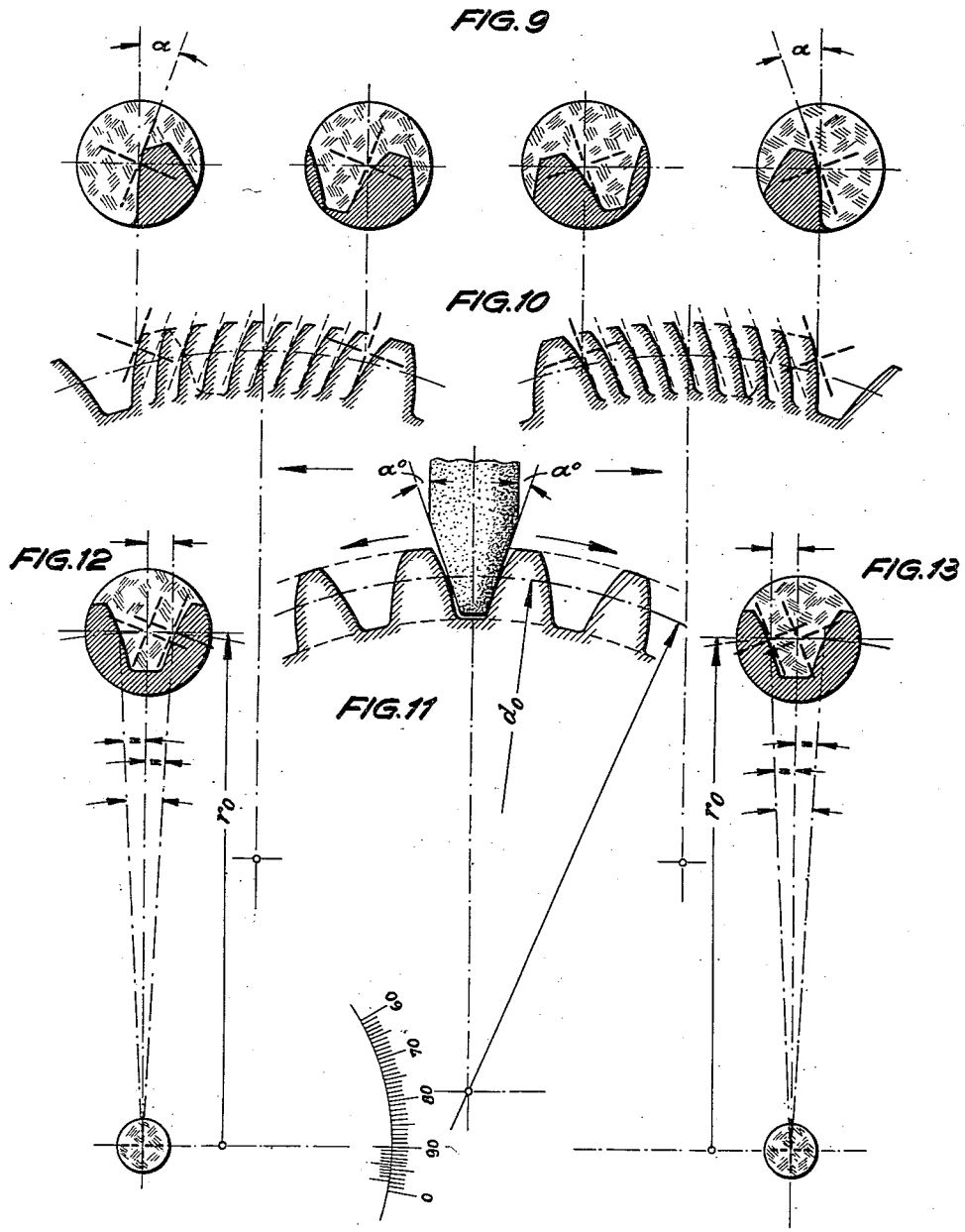

INVENTOR
Max Oesterheld
by E. J. Freeman
his Agents

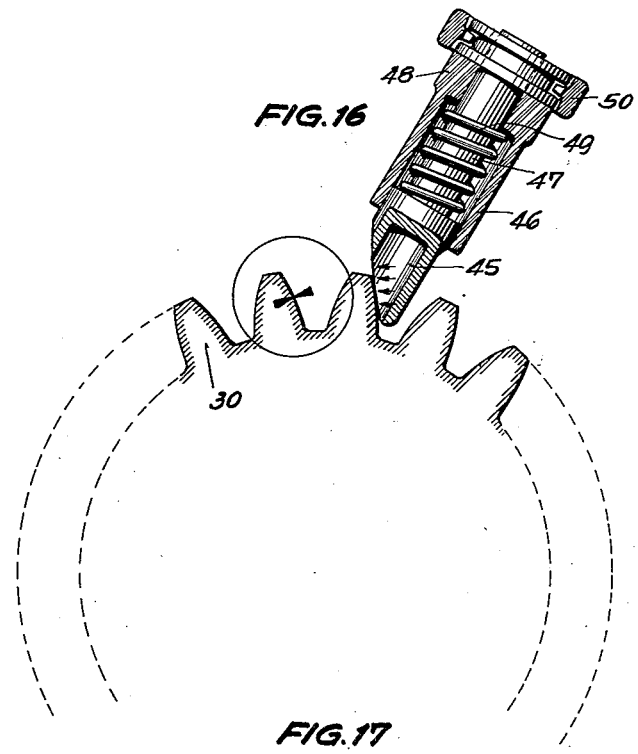
FIG. 16
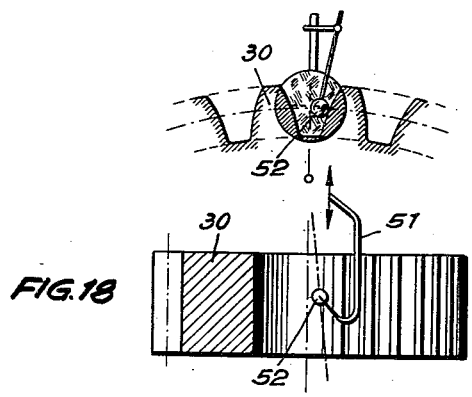
FIG. 17
FIG. 18

June 25, 1957 M. OESTERHELD 2,796,672
APPARATUS FOR TESTING COGWHEELS, CUTTING WHEELS, OR
SIMILAR WHEELS AND MORE
Filed June 10, 1952 12 Sheets-Sheet 9

INVENTOR:
MAX OESTERHELD,
BY
His Agents.

June 25, 1957 M. OESTERHELD 2,796,672
APPARATUS FOR TESTING COGWHEELS, CUTTING WHEELS, OR
SIMILAR WHEELS AND MORE
Filed June 10, 1952 12 Sheets-Sheet 10

INVENTOR:
MAX OESTERHELD,
BY
His Agents.

June 25, 1957 M. OESTERHELD 2,796,672
APPARATUS FOR TESTING COGWHEELS, CUTTING WHEELS, OR
SIMILAR WHEELS AND MORE
Filed June 10, 1952 12 Sheets—Sheet 11

INVENTOR:
MAX OESTERHELD,
BY
Freeman & Marmorek,
His Agents.

United States Patent Office 2,796,672
Patented June 25, 1957

2,796,672

APPARATUS FOR TESTING COGWHEELS, CUTTING WHEELS, OR SIMILAR WHEELS AND MORE

Max Oesterheld, Remscheid, Germany, assignor to Albert Strassmann K. G., Prazisions-Werkzeug- und Maschinenfabrik, Remscheid-Ehringhausen, Germany, a firm Application June 10, 1952, Serial No. 292,687

Claims priority, application Germany June 13, 1951

8 Claims. (Cl. 33—179.5)

This invention relates to an apparatus for testing cogwheels, cutting wheels, or similar wheels. It is usual in testing an involute to caliper same, and to register the calipering by means of recorders for the evaluation of errors.

In a cogging machine, however, the involute teeth are obtained in such a way that either the cutting edges of a rectilinear tool (rack tool, rolling cutter, grinding wheels) or the cutting edge of an involute-shaped tool (cutting wheel) develop the involute. Angle or action angle errors of the tools are transmitted to the work piece. In the workshop, therefore, the angular position of the tool's cutting edge matters most as it produces the action angle of the teeth to be made. Whereas there is no special difficulty in testing the pressure angle of tooth of racks and similar tools, it is far more difficult to measure the action angles of cutting wheels. In the latter case the conventional testing apparatus fail and the tests can be made on the finished work piece only. Such measuring of the work piece by means of the conventional involute test apparatus, however, gives values for the manufacture only indirectly; in other words the base circle diameter is measured and in this way the angle of action is computed.

Apart from the wear to which the caliper points of the measuring instruments are subject, and from possible errors of the recorder, the complicated measuring methods and the above mentioned apparatus respectively are not applicable for testing a cutting wheel (tool). The cutting wheel has cutting angles and it is only the projection of its cutting surface that matters and must be tested.

Optics offer a possibility to reproduce, in the test, the manufacturing process with a rectilinear tool and to measure the angle directly. It is of great importance that all the necessary measuring of teeth can be done by means of such an optical instrument with the highest degree of accuracy. In this method it does not matter whether the required projection of a cutting wheel or direct measuring of a straight-toothed spur gear is concerned. Hitherto it was only the involute of a straight-toothed spur gear that could be measured by means of an involute test apparatus. To obtain further values required, such as base pitch, tooth thickness, error of single pitch, faulty revolution and direction of teeth, it was necessary to resort to different mechanical measuring instruments in each case, the reliability of which instruments was often open to doubt.

To provide a testing apparatus for all the necessary measurements to be made most simply, I suggest arranging an optical revolving table on a base frame which is provided with a longitudinally movable measuring carriage and a transverse slide capable of being displaced on said carriage and carrying a focussing microscope, and inserting into said table a hollow shaft which can be coupled with the face plate of said table and has a rolling disk rolling on a rule connected to the longitudinal carriage, and an exchangeable holding device (dead center or the like) for the test piece.

The hollow axis is provided with a cross line plate, lit by a source of light disposed below the revolving table, for the focussing microscope to be centered. In this way it is possible first to fix, most exactly for all measurements, the center of the test piece. To said shaft is clamped a holding arm provided with a platform for the source of light and with a slit or the like receiving a tappet of the mandrel carrying the test piece. By means of said source of light, the profile of the test piece or a section of it is imaged in the focussing microscope.

To fasten the test piece and the mandrel respectively an upright with a slide guided vertically may be disposed beside the revolving table on the machine frame, said upright carrying a second dead center for the testing mandrel.

With such measuring instruments it is essential that, when any test piece rolls on a rule, there should not be transmitted any amount of power that might lead to sources of error in measuring. To this end, there is fitted into a recess provided between the longitudinal and the transverse slides another slide provided on its front side with a magnetic rule leaning against the exchangeable rolling disk. The latter slide is on its front surface provided with permanent magnets carrying a rule consisting of two steel bridges and an intermediate layer of brass. Said rule, therefore, constitutes a permanent magnet so that so to speak it sticks to the rolling disk and in this way, when moving in a straight line, sets the mandrel with the rolling disk in rotation without exerting any pressure. This goes on without slip as the magnetic forces act as a brake at the stationary point of masses.

Further objects and advantages of the present invention will be apparent from the following description reference being made to the accompanying drawing wherein a preferred embodiment of the present invention is clearly shown.

Figure 2:
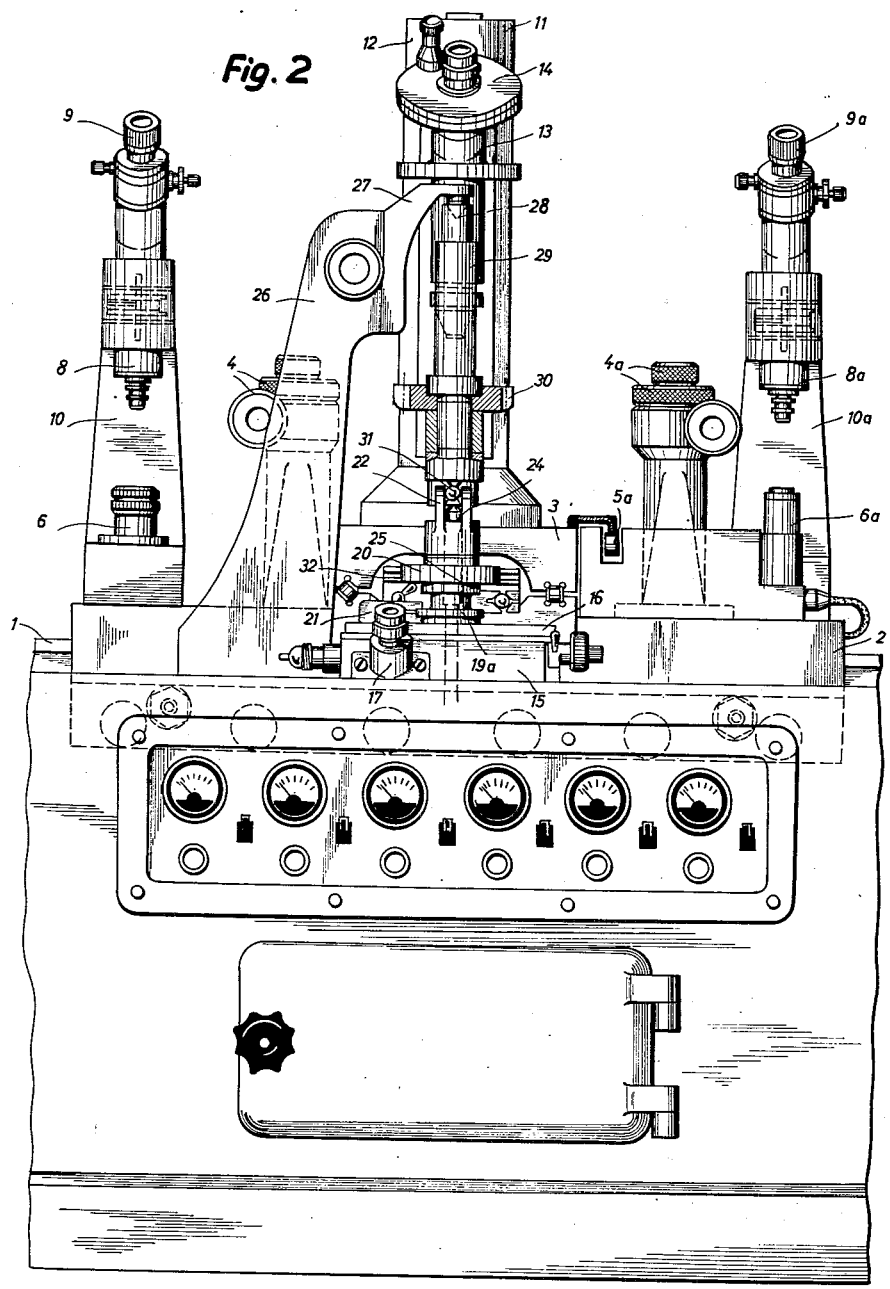
Figure 14:
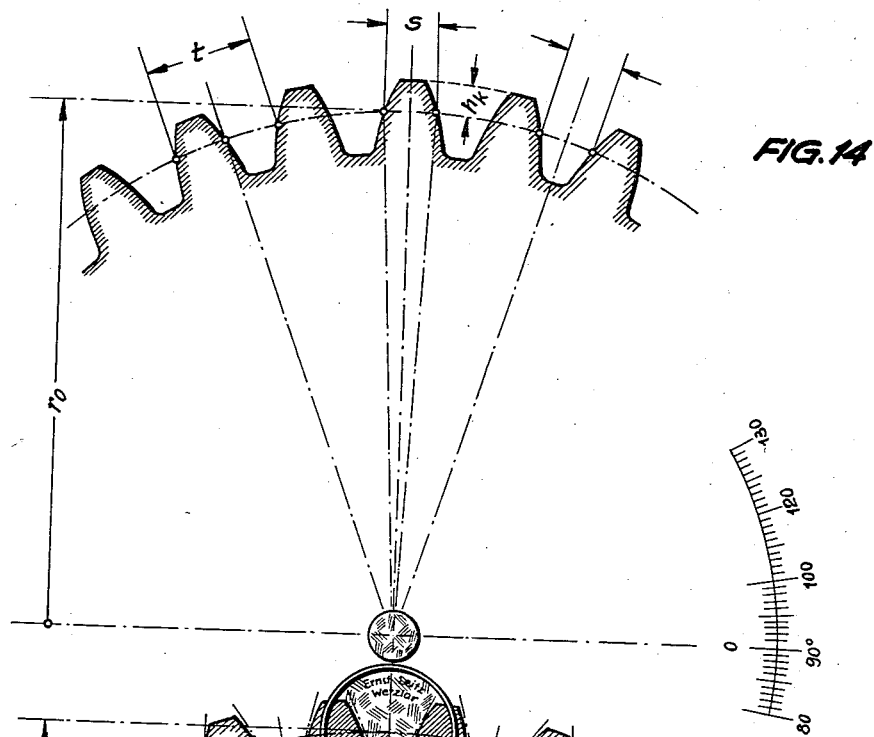
Figure 15:
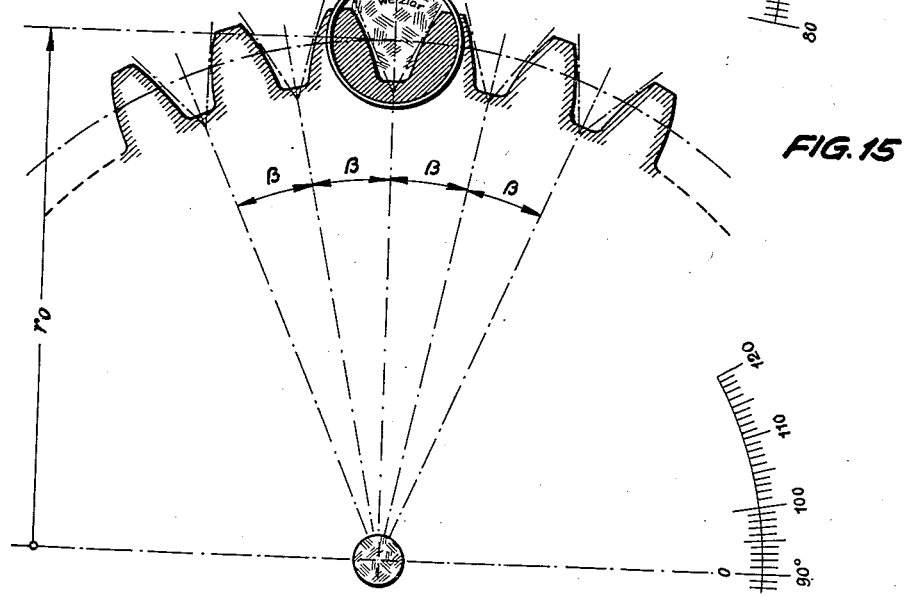
Figure 19:
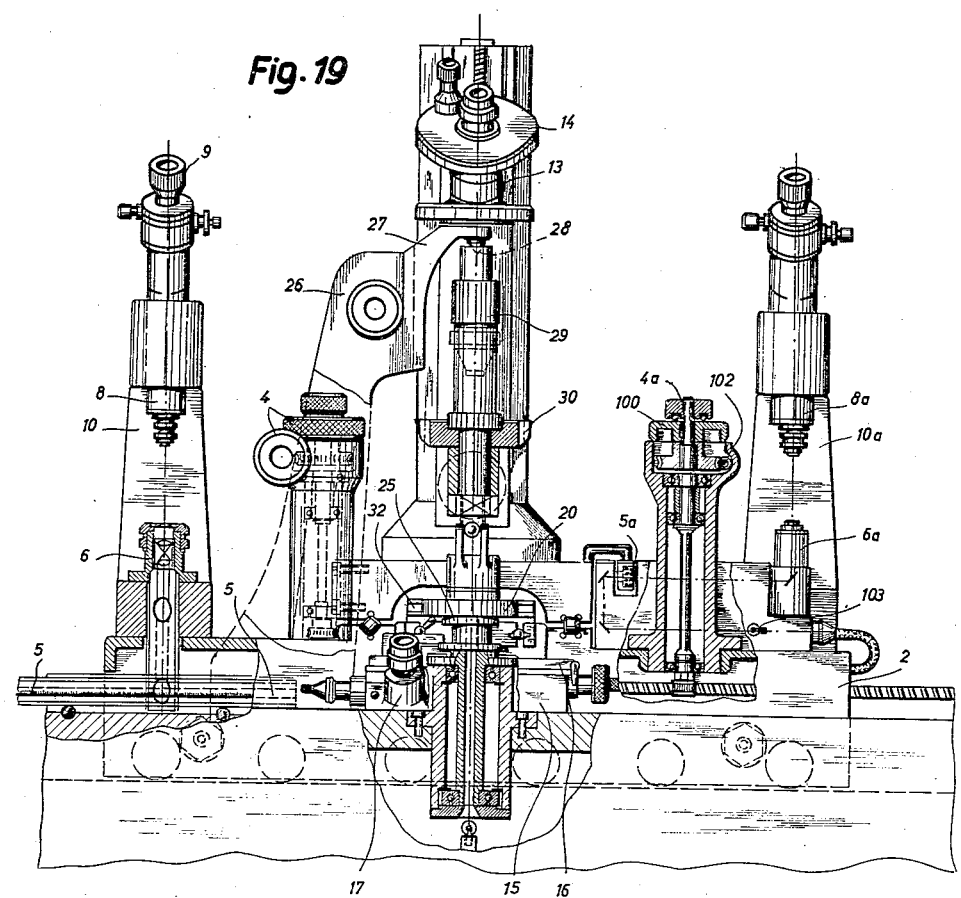
Figure 20:
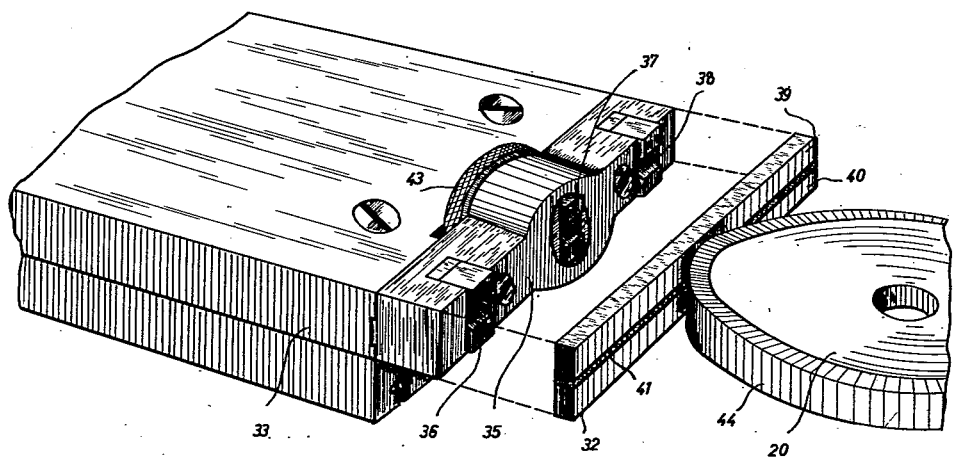
Figure 21:
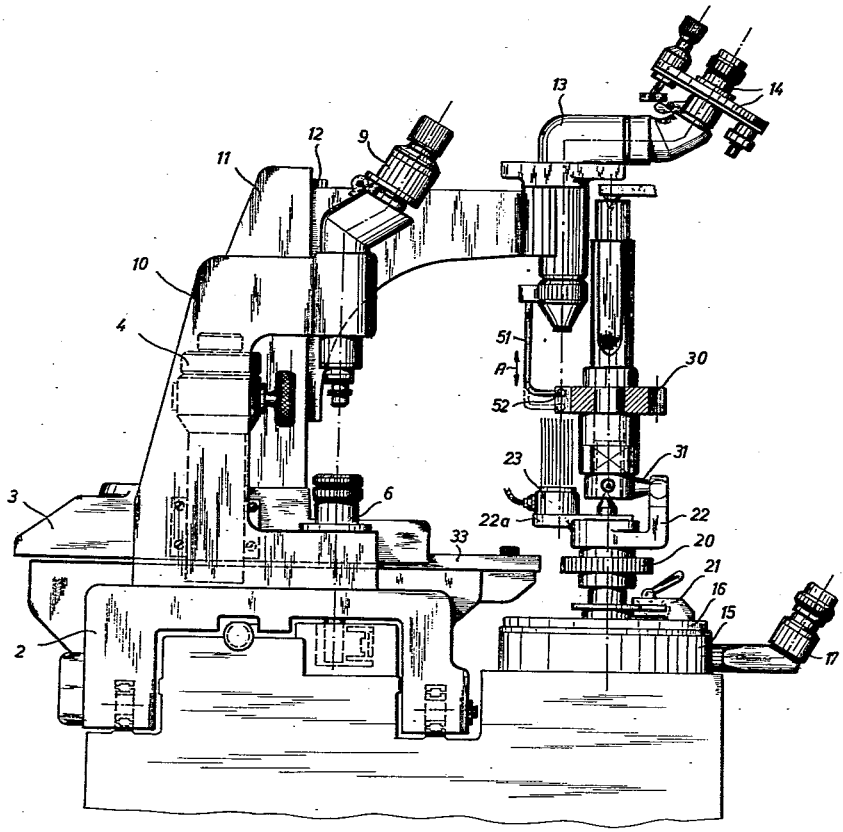
Figure 22:
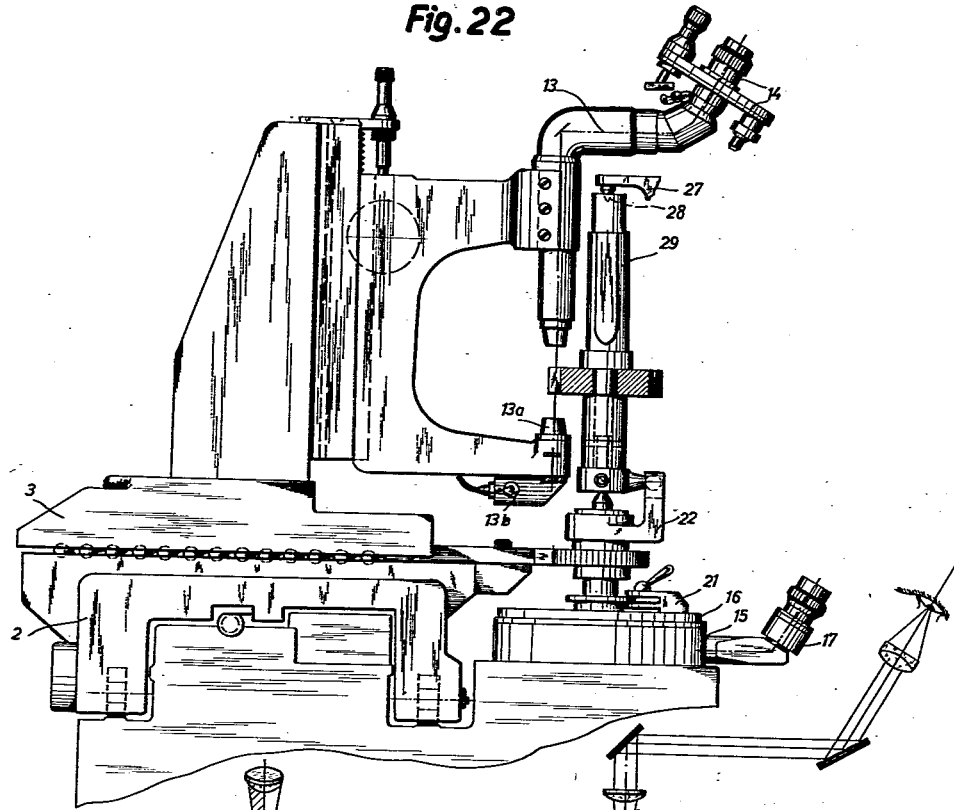
Figure 23:
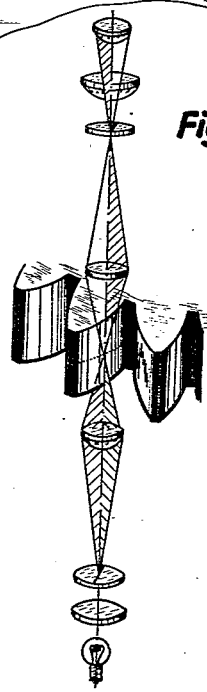
Figure 24:
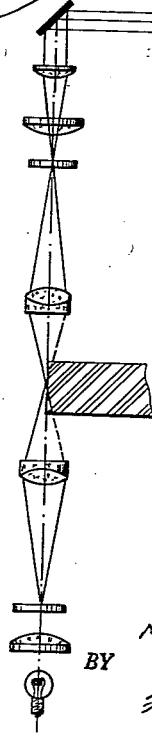
Figure 25:
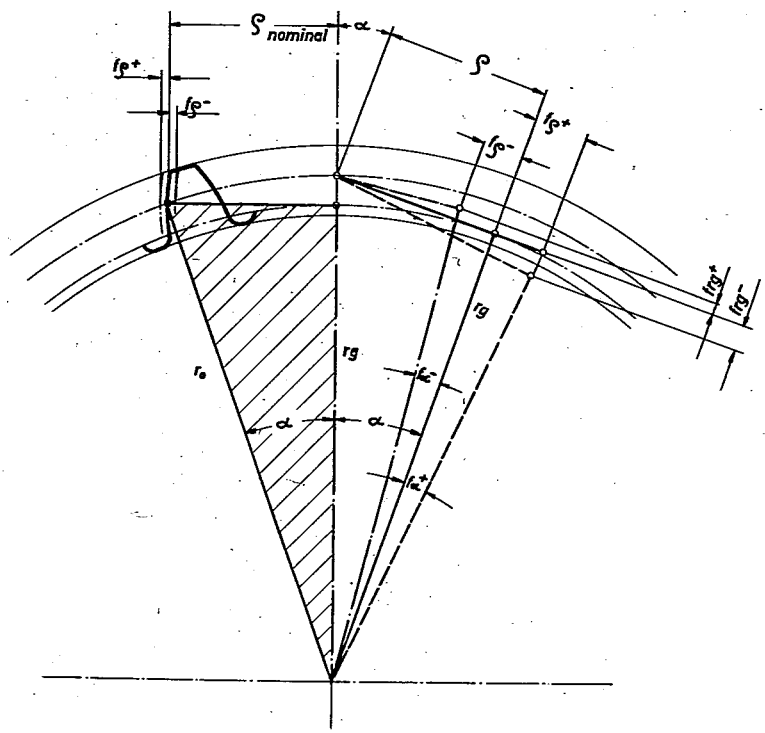

Figure 1 is a side view,
Figure 2 a front view,
Figure 3 a side view of the sliding rule,
Figure 4 a top view on Figure 3,
Figure 5 a view of a detail,
Figures 6 to 8 show the test image of punctual measurement of an evolute,
Figures 9 to 13 show the test image of tangential development of the evolute,
Figures 14 and 15 show the test image for measuring the tooth thickness, tooth gap, pitch, and truth of running,
Figure 16 shows an auxiliary instrument for applying the pitch comparison method,
Figures 17 and 18 show an auxiliary instrument for testing errors of the direction of tooth,
Figure 19 is an elevational view, partly in section, similar to Fig. 2,
Figure 20 is a fragmentary large scale extended perspective view showing a detail illustrated at the front of Fig. 4.
Figure 21 is a side elevational view, partly in section, similar to Fig. 1, but showing the attachment of Figs. 17 and 18,
Figure 22 is a side elevational view, similar to Fig. 1, but showing a projection microscope and an observation microscope in opposite relation,
Figure 23 is a perspective schematic view of the optical path of the arrangement of Fig. 22,
Figure 24 is a schematic sectional view of the said optical path, and
Figure 25 is a schematic view showing the geometrical and arithmetical relationship of the optics involved.

On the base frame 1, a measuring carriage or longitudinal slide 2 rolls lengthwise in special guide rails (Figs. 1 and 2). A transverse or cross slide 3, guided by rollers, slides on said measuring carriage, crosswise to said guide rails. These two slides are adjustable through racks by means of coarse and fine adjustment, by the respective adjusting mechanism or elements 4 and 4a. As best shown in Fig. 19, the element 4a, for instance, may be operated for coarse adjustment by means of a screw 100, and by operating a knob 101 it may be actuated for fine adjustment through the turning of a worm gearing 102, in conventional manner. The element 4 may be operated for coarse and fine adjustment by a similar arrangement, as shown in Fig. 19. A precision scale 5 is inserted into the base frame 1, as shown in Figs. 1 and 19. By means of an intermediate optical element 6 and special lighting bulb 7 the millimeter division of the scale 5 is made visible in a reading microscope 8. A precision eyepiece 9 subdivides each millimeter into 1/10 to 1/100 and 1/1000 of a millimeter. The reading microscope 8 is fastened in a support 10 erected on the measuring carriage 2. When the adjustment element 4a is operated the optical element 6 slides along the rigidly fixed scale 5 whereby a difference in length of 1/1000 of a millimeter can be exactly ascertained. Similar optical elements 8a and 9a with a support 10a are disposed on the right side of the measuring carriage (Fig. 2 and Fig. 19). By operating the adjustment element 4 the transverse slide 3 is displaced together with the glass scale 5a (Figs. 2 and 19) attached laterally. The millimeter division of the latter scale 5a is projected by the second optical set 6a, and observed in the microscope 8a and 9a. As shown in Fig. 19, a pencil of light is projected from a lamp 103 and guided to the scale 5a to illuminate the same similarly to the light path emanating from the bulb 7 (Fig. 1) for the scale 5. The reading of the scale 5a is projected to the microscope 8a, as shown in Fig. 19. In this way the invention provides a two-dimensional measuring plane. The transverse slide 3 carries a support 11 with a slide 12 having a holding arm, said slide 12 being movable vertically on said support 11. To said holding arm is attached a focussing microscope 13 with a revolving graticule. A goniometer eyepiece 14 with special cross lines permit any angular adjustment from 0 to 360°. The precision of reading is one minute. Points of measurements may be fixed by means of the focussing microscope 13.

According to the invention, an optical revolving table 15 is disposed centrally on the front portion of the base frame 1. Its face plate 16 can be turned by coarse and fine adjustment elements. In an eyepiece 17 can be read the rotation of a lit scale with a vernier having a 360° graduation. The accuracy of reading is one minute. At the center of the revolving table 15 there is a bushing 18 serving as a bearing for a shaft 19. Above the face plate 16 and the shaft 19 is formed to receive an easily exchangeable rolling disk 20 (Figs. 1 and 20). On the face plate 16 there is disposed a clamping device 21 for a collar 19a of the shaft 19 to be firmly connected to and loosened from the face plate, by means of a toggle 16a. When the toggle is loosened the shaft 19 rotates, without the face plate 16, in the bushing 18, and when the toggle is tightened it turns only with the optical revolving table 15 in rotation.

Immediately above the rolling disk 20 there is attached a holding arm 22 having a projecting piece 22a for carrying lighting means 23. On the upper end of the shaft 19 there is provided a removable center 24, below which center there is arranged a reticle 25 that is illuminated by a bulb 25a through the bore of the shaft 19. The reticle 25 has centrally arranged intersecting cross lines, enabling accurate axial centering of the microscope 13, when the center 24 and workpiece 30 have been removed. The bulb 25a is operable to project the image of the cross lines into the microscope 13. On the left side of the revolving table (Figure 2) there is an upright arm 26 fastened to table 15 and provided with a slide 27 guided vertically and operated by rack drive and spring tension means. A second center 28 fastened in an arm of the slide 27 is adjusted accurately in the direction of the axis of the shaft 19. Hence a mandrel 29 with a test piece 30 (cogwheel or cutting wheel) can be inserted between the two centers 24 and 28. A driving pin 31 may be mounted in the holding arm 22 free from play.

To be able to carry out the rolling process in like manner by the measuring apparatus and in the machine tool, it is necessary that the rolling disk 20 be set in rotation by means of a rule 32 attached to the longitudinal carriage 2 (Fig. 1 and Fig. 20). The rule 32 can be displaced in the direction of the transverse slide 3 to and from the disc 20. Rolling free from slip depends on the contact pressure between the rule 32 and the rolling disk 20. The pressure forces, however, are far from favorably influencing the measuring instrument and the accuracy of measurement respectively. For this reason I suggest the following construction in which the repercussion of forces on the instrument is entirely removed and the slip-free contact between the rule 32 and periphery of the disk 20 is promoted by releasably actuating magnetic force.

Figures 3 and 4 outline the measuring carriage 2 of the apparatus with the cross slide and the microscope upright 11. Another slide 33 is inserted into a bridge-shaped recess between the carriage 2 and slide 3. The slide guides are designed in the form of ball paths 34 which ensures smooth running free from play. To the slide 33 there is screwed a magnet holder of non-ferrous metal, which for example carries three permanent magnets 36, 37 and 38. In front of these magnets, as best shown in Figs. 4, 5 and 20, there is disposed the rule 32 consisting of two thin steel bridges 39 and 40 with an intermediate layer 41 of brass between. The central magnet 37 is mounted in a brass cylinder bolt 42. At one end the cylinder bolt 42 has a knurled collar 43 projecting in the form of a segment from its socket. By means of the knurled collar 43, the cylinder bolt 42 may be turned in its bearing. In this way this magnet 37 can be reversed and the action of the two adjacent magnets 36 and 38 so weakened that the rule can be loosened easily from the rolling disk 20.

Preferably the rolling disk 20 is made from synthetic or non-ferrous material and provided with an outer steel ring 44 (Fig. 20). If, therefore, the slide 33 with its rule is conveyed towards the edge of the rolling disk 20 and if the central magnet is reversed to "plus" by turning the knurled collar 43, the rule 32 magnetically adheres to the steel ring 44 of the rolling disk 20. The lines of force emanating from the three magnets 36, 37 and 38 run over the rule 32 through the steel ring 44 from one pole to the other pole of the magnets and cause the rule 32 to adhere firmly to the steel ring 44. In this way the forces do not act on the measuring apparatus. When operating the measuring carriage 2 the rule 32 is drawn along the rolling disk 20 whereby the latter is set in rotation. At each moment the lines of force cross the steel ring 44 at different points. In this way any unwanted slipping of the disk 20 which means its turning with the rule 32 at standstill, is avoided and could occur by force only.

By means of such an apparatus, for example, the following measurements can be carried out:

(1) *Point by point optical involute testing by the rolling method*

When taking measurements by means of optical apparatus, it is essential for all steps of measuring to start from the center of the axis of the test piece. When so positioning the two measuring slides 2 and 3 lengthwise and crosswise that the reading microscope 13/14 is placed above the axis of the shaft 19, the cross lines of the reading microscope 13 can be disposed to lie in congruence with the cross lines of the reticle 25 of the said axis. At first, however the inserted center 24 must be removed. When now turning the shaft 19 of the measuring apparatus in its bushing 18, it is possible at the same time to check the axial alignment of the shaft 19 of the instrument. The position of the focussing microscope 13 can be determined on the two rigidly attached scales, 5 for longitudinal and 5a for transverse displacement. The precision eyepieces 9 and 9a permit to adjust the scales to zero; this means that the two scales 5 and 5a will show the value "0" mm. when the microscope 13 is adjusted to the cross line intersection point of the reticle 25. The transverse scale 5a has readings from 0 to 200 mm., and the longitudinal scale 5 extends 100 mm. each to the right and left sides. In this way it is very easy to read the scales. All measurements shall start from the basic numbers "0" adjusted as described. If for instance the reading or focussing microscope is to be adjusted to a base circle or a pitch circle radius, the cross slide 3 is by means of the coarse and fine adjustment mechanism 4 moved to a point where the wanted number appears in the precision eyepiece 9a. The longitudinal slide 2 remains in its fixed intermediate position "0." The accuracy of its adjustment can at any time be checked again through the basic number "0."

The "point by point optical involute test" proper goes on as follows:

The work or test piece 30, a gear or a cutting wheel, is set on the mandrel 29 running truly. The mandrel 29 is inserted between the two centers 24 and 28 with its axis coinciding with that of the shaft 19 (Figures 1 and 2). A tappet 31 with its ball pivot is coupled with the holder 22 so as to run with it free from play. With loosened toggle of the clamping appliance on the face plate 16 of the optical revolving table, the work piece 30 may be turned most easily. The focussing microscope 13 is displaced with the transverse slide 3 to a point where the base circle diameter "rg" (see Fig. 8) appears in the reading eyepiece 9a as a numerical value (see Fig. 7). Thereupon the slide 12 (Fig. 1) is displaced vertically on the support 11 to a point where the image of the tooth flank appears with sharp contours in the focussing microscope 13 or goniometer eyepiece 14. In its center the reticle 25 has a small circle or two opposite arrow marks besides the cross lines (Figs. 6 and 8). The clamping device is tightened and hence the mandrel 29 of the work piece is connected to the face plate 16 of the optical revolving table 15. By means of the fine adjustment appliance of the optical revolving table the work piece is turned until the center mark in the eyepiece 14 touches a right or left tooth flank of the image of the work piece 30 or intersects a circular mark. When the apparatus is adjusted as described the magnet rule 32 is brought towards the interchangeably journalled rolling disk 20 (having the same diameter as the base circle) of the work piece 30, and the magnet 37 is turned to "plus." When the clamping appliance is loosened, there is obtained coupling between carriage 2 and shaft 19. The movement of the carriage 2 in a direction which is parallel to the tangent on the disc 20 causes the center mark in the goniometer eyepiece to traverse the same arc of the involute of the work piece where the pressure angle is at a correct value. If the angle is not correct, the center mark, namely the point defined by the two arrowheads, or the small circle on said plate, will move away from the involute arc where the action angle is too wide, and will go upon the silhouette of the tooth flank face where the action angle is too narrow. The said center mark corresponds to the nominal or theoretically correct value for each position of the involute. The nominal value which is read on the longitudinal scale is a theoretical value which differs from the actual value of each position of the involute along the tooth by a deviation which takes into account the value of the pressure angle as well as the error actually encountered from the theoretical in the tooth form. The displacement of carriage 2 on the scale at the position of the marking point can be read on scale 5. The difference or deviation from the nominal value, which can be seen by the eye, is in a certain relation to the actual pressure angle. Direct conversion is not possible. For this reason reference is made to the actual base circle. An error of the pressure angle corresponds to one of the base circle diameter. If the distance covered by the longitudinal slide is denoted by $\rho$-nominal, this value corresponds to the base circle radius $rg$-nominal. $\rho$-Actual corresponds to the base circle radius $rg$-actual. This may be expressed by the equation set out; in the bottom of Fig. 25.

$\rho$-Nominal and $\rho$-actual may be read on the longitudinal scale. $rg$-Nominal is known. Reading is done as follows:

The involute is rolled off as far as possible as shown by the displacement diagrammatically in Fig. 25 (see Figure 6). Its position with respect to the scale is read on scale 5 through the eyepiece 9. The value read corresponds to $\rho$-nominal. To determine $\rho$-actual the contact between the magnet rule 32 and the nominal base circle 20 is loosened, which means that the position of the involute arc in regard to the value $\rho$-nominal is unchanged. To this end the toggle of the clamping appliance is tightened, and the rule 32 is then loosened from the base circle disc 20. Now the graticule mark and carriage are moved to be disposed above the involute point which is the actual point on the tooth, and the scale then indicates the value of $\rho$-actual. With too wide an angle of action, $\rho$-actual proves smaller than $\rho$-nominal to provide a distance measurement between these two values; illuminated with light to the eye at the microscope there will appear a narrow light beam between the marking point and the involute. With too narrow a pressure angle as is shown in the equation and diagram of Fig. 25, $\rho$-actual will be greater than $\rho$-nominal, and the relation will be reversed when the angle is too wide, in accordance with the above explanation. $rg$-Actual is thus determined, and $\cos \alpha$-actual can be computed in accordance with equation "b."

(2) *Involute test by reproducing the manufacturing process*

The tangential development of lines of the involute is much simpler than the point by point (plotting) optical involute test. It corresponds to the reproduction of the manufacturing process in rolling motion by means of rectilinear tools (vide Figs. 9 to 13). Figure 11 shows a grinding wheel with rack profile in the gap of a tooth rim. The right and left tooth flanks are ground in rolling motion. In this method the pitch circle diameter is used as rolling disk diameter. In this case the angle of the tooth flank corresponds to the pressure angle (between the tool flank and the center of the tooth).

To reproduce the generating flank line use is made of the goniometer eyepiece 14, which permits turning the cross lines through 360° and precision reading in one minute's time. The rolling disk 20 shall have the same diameter as the pitch circle. Reproduction of manufacture by the measuring apparatus goes on as follows:

The carriage 2 must be set to zero. The transverse slide 3 and, therefore, the focussing microscope 13/14 are adjusted to the pitch circle diameter "ro." The shaft 19 of the apparatus is coupled with the mandrel 29, through tappet and holder 31 and 22, with the optical revolving table 15/16, by means of the clamping appliance 21. When the focussing microscope 13/14 is sharply focussed, the gap center is searched as follows. For this purpose the cross lines in the goniometer 14 are, for example, set to 20°, and the tooth flank directed correspondingly is caused to lean against a cross line by turning the fine adjustment screw of the optical revolving table 15. The angular position of the revolving table shall be recorded. Thereupon the cross lines must be swung through 20° in the opposite direction, and the other tooth flank has to be laid on. Half the difference of angles read on the optical revolving table indicates the gap center. The same middle position may be attained by means of an angularly marked grate which may be disposed in the revolverhead of the ocular and interposed in the optical path. The work piece 30 is simply turned to reach a point where both flanks touch the angle legs uniformly. In this way the middle position is fixed. When now using again the turning cross lines of the goniometer and adjusting to the angle α-nominal, the cross line will be positioned above the gap center. By lateral displacement of the measuring carriage 2 there will be obtained a contact of lines on the tooth flank (vide Figs. 12 and 13). In this position the rule 32 must be connected to the rolling disk 20. The measuring carriage now performs the linear motion of the tool. The involute unrolls with a uniform contact of lines, provided the angle is α-nominal. If the angle of action of the test piece is too wide, the involute will toward the top of tooth depart from the contact lines, and there will be a light gap. If the pressure angle of action is too small, the involute will move into the silhouette. By adjusting the angle in the goniometer and repeating the procedure the error of angle will be found quickly and the true pressure angle of action will be ascertained soon, i. e. the pressure angle of action α-actual is read immediately on the graduation of the goniometer 14. When subjecting the second flank to the same procedure, there will be obtained clear characteristics of either flank and consequently it is possible in this way to control the manufacture in the workshop.

(3) *Test of the base pitch*

The base pitch is known to be the distance between parallel tangents to two adjacent right side (or left side) flanks in a plane perpendicular to the axis. The position required for the test of the base pitch is given from the involute test. As will be seen from Figure 8 the test piece has merely to be retained in the last position of the involute development, i. e. to be blocked by the clamping device 21 and to be uncoupled from the movement of the measuring carriage (lifting the guide rule 32 from the base disk 20). In this measuring position, two flanks lie parallel to the axis as required. In this way the distance "te" (Fig. 8) can be ascertained most accurately by measuring the difference on the scale.

(4) *Test of tooth form errors*

This test may be made simultaneously with the involute test. When the involute is developed, irregularities will at once become visible. The optical instrument gives a thirty fold magnification and permits measuring fractions of $1/100$ of a millimetre.

(5) *Test of tooth thickness, tooth gap, and pitch*

Figure 14 shows at a glance that it is possible for tooth thickness, tooth gap and pitch to be reliably tested by means of an optical instrument. It is merely necessary, e. g. when testing the tooth thickness, for the tooth to be disposed accurately vertical aligned on the axis of the microscope 13. As described above, adjusting is done by means of the optical revolving table (set measuring mark to right tooth flank, then to left tooth flank, determine from reading of angle middle on the revolving table scale). If the position of the tooth is perpendicular to the turning axis, the measure mark in the reading microscope 13/14 must be laid on the external diameter and the known height of the top of tooth (Figure 14) is to be deducted from the scale reading. In this way the measure of the thickness of the tooth (indicated in Fig. 14) at "S" is ascertained on the longitudinal scale by laying the measure marks on the right and left tooth flanks. If necessary, of course, the pitch circle radius may be set from zero, which ought to give the same results in the case of gears without tooth correction.

It will not be necessary to give further details as to the measurement of the gap or the pitch "t," as practically there will be the same handling.

(6) *Test of errors of pitch and of truth of running*

To test errors of pitch use is made of an optical index plate and of a 55° division mark. One tooth gap is disposed vertically to the axis. The graticule with the angle of 55° is to be so aimed at the gap that the two angle legs touch the right and left tooth flanks. If for example a toothing of 30 teeth is to be tested, the base or initial position must be divided further by $$\frac{360}{30} = 12°$$

each. Errors of pitch, truth of running, and of gap may occur in common, and not in each case is it easy to find these three values separately. If there is neither an error of pitch, nor one of true running, nor one of gap width, the division mark will with each pitch touch the two tooth flanks as it did in the initial position. If there is for example not an error of pitch but one of true running, the two tooth flanks will from pitch to pitch steadily depart, either increasingly or decreasingly, from the 55° division mark. When such a steadily increasing or decreasing tendency is measured by means of the cross slide and recorded on millimetre paper, the error of true running will be represented. In the case of errors of pitch, the flanks will more or less unilaterally, or even bilaterally, creep over the angle mark. If there are errors of gap width, the angle mark will more or less deeply penetrate the gap. In this case a steady increase or decrease in the measure recorded indicates not an error of the tooth gap but one of true running.

With such an apparatus the pitch comparison method may be used, in which method hitherto a feeler resting on a stop has actuated another, movable feeler acting on a measuring clock.

According to the invention, the same measurements are carried out in the optical measuring instrument by means of a permanent magnet 45 serving as a stop feeler (Figure 16). In a guide (46) there is mounted a bolt 47 carrying a stop 48 and being loaded by a spring 49. By means of a small lever 50 the bolt 47 can be removed from the toothing of the test piece against the bias of the spring 49, and be turned around.

The stop feeler is a permanent magnet 45 attracting the tooth flank with invariable force. The measuring pressure does not affect the instrument since practically no counterpressure has to be absorbed. The counterweight and its accessory hitherto required to produce measuring pressure are no longer required. The movable feeler and the measuring clock are replaced by the microscope. The rigid feeler is replaced by the magnetic feeler, and it fixes the position of the test piece 30 by blocking one tooth flank. In the initial position, a division mark in the microscope is leveled at the adjacent, corresponding tooth flank. When proceeding from tooth to tooth, differences in pitch may be observed most accurately in the microscope. By turning the bolt 47 through 180°, to be used with the opposite tooth flanks, errors of pitch both of the right and the left tooth flanks will quickly be ascertained. What matters most is the fact that the pitch can be tested without an additional measuring apparatus and that the new method of measuring ensures invariably uniform measuring pressure.

(7) *Test of errors of the direction of tooth*

To find such errors use should be made of a mechanical auxiliary instrument. To the microscope tube is clamped a holder carrying on a spring wire 51 a small ball 52 (Figures 17 and 18 and 21). The distance between the ball and the microscope is always the same and corresponds to the object distance of the focussing microscope. When the focussing microscope 13 is moved vertically (see arrow "A" of Fig. 21 the ball 52 slides along the tooth flank. In the case of errors of the direction of tooth, the ball projection will slide away from the cross line image in the eyepiece 14.

(8) The perflectometer method applied to the cogwheel test apparatus

In the test of cogwheels the described optical cogwheel testing instrument leaves an imperfection which can be overcome by using the perflectometer method. The conventional optical measuring methods give satisfactory results only in the case of work pieces having sharp edges. If for example the edges of cogwheels are chamfered, as is true of sliding wheels used in motor vehicle and machine industries, there will be blurred images in the lenses and the results of measurement will be unreliable.

The perflectometer, also known as reflex image microscope, method permits feeling surfaces optically. This is shown in Figs. 22, 23 and 24. A projection microscope 13a and an observation microscope 13 are disposed opposite to each other at a determined distance. The two optical systems are brought into such relation to each other that their foci will coincide. In the projection microscope there is provided a graticule projected by means of a bulb 13b. When the work piece (cogwheel) is conveyed to the center of the pencil of rays, the projection of the graticule for example on the tooth flank is reflected so as to become visible in the observation microscope 13 in which, therefore, there will not appear a section of the silhouette of the work piece but the projection image of the graticule provided the reflecting surface is porperly disposed (see Figs. 23 and 24). In the case of curved surfaces the projected graticule image will appear more or less curved. The highest point of the curved graticule image is caught at the center of the double cross lines of the observation microscope. When, with such adjustment of the perflectometer, the above described cogwheel test apparatus is for example used for the development of the involute, the projection image will remain within the double cross lines if the angle of action is true. Errors are ascertained in the same way as in ordinary optics.

On a purely optical basis, the perflectometer method offers an additional advantage in the test of errors of direction of tooth. When the microscope objectives, which are rigidly connected to each other, are moved horizontally, the projection image will wander along the surface to be tested. Errors of the direction of tooth will at once result in departure of the projected graticule from the double cross in the observation microscope. It will not be difficult to measure the errors by means of the scales.

What I claim is:

1. Apparatus for optical gear shape testing, comprising, in combination, a base frame, a measuring carriage carried by said frame, a slide carried by said carriage, means for moving and adjusting said carriage lengthwise on said frame and said slide crosswise on said carriage, a focussing microscope carried by said crosswise movable slide, an optical revolving table arranged near the center of said frame, a hollow shaft rotatably mounted within said table, means for respectively coupling and uncoupling said shaft with said table, a rolling disk mountable coaxially on said shaft, a straight rule connected to said carriage and operable to abut against the periphery of said disk for rolling contact therewith, a cross line plate arranged on said shaft for optically centering said focussing microscope, a source of light arranged below said table for lighting said cross line plate, an arm clamped to said shaft, a projecting piece carried by said arm, a second source of light resting on said projecting piece, and projecting light rays upwardly, a slit provided in said arm, an upright arranged beside said table and on said frame, a slide guided vertically on said upright, a center carried by said slide, another center provided on the upper end of said hollow shaft, a mandrel arranged between said centers, and a driving pin provided at said mandrel and engaging said slit, said mandrel carrying a work piece above said second source to be tested.

2. Apparatus according to claim 3, said field generating means comprising permanent magnets carried by said slide on its face, said magnets carrying said rule consisting of two steel bridges and an intermediate layer of brass, an exchangeable rolling disk made from non-magnetic material, and a steel ring provided at the circumference of said disk and leaning against said rule.

3. In an apparatus for optical gear shape testing, in combination, a frame, a measuring carriage oppositely movable lengthwise on said frame, a slide oppositely movable transversely on said carriage, a microscope vertically adjustably supported on said slide, an optical revolving table disposed on said frame including a hollow shaft coaxial with said table and rotatably mounted therein, means operable for releasably coupling said shaft with said table for tied rotation, means actuable for removably supporting axially of said shaft a gear shaped test piece rotatable with said shaft, means operable for moving said carriage and said slide to position said microscope, a cross-lined plate on said shaft to optically center said microscope, means operable for simulating between the optical axis of said microscope and said test piece the involute movement of the latter comprising a rolling disc connected for rotation to said shaft and interchangeable for coordination with a valve of the shape of said test piece, a straight rule supported by said carriage and being movable to abut against the periphery of said disc and operable for rolling contact therewith, in the abutment position, means operable for generating between said rule and said disc periphery a magnetic field to render said rolling contact slip-free, and means actuable to change the magnitude of said magnetic field to increase and decrease, respectively, the attraction between said rule and disc periphery.

4. In an apparatus, as claimed in claim 3, and lighting means emitting a pencil of light emanating from a source and projected axially from below through the interior of said shaft to illuminate said cross lines forming an optical reference for said microscope.

5. In an apparatus, as claimed in claim 3, said test piece supporting means including an arm connected to said shaft, and having a slot, a rotatable mandrel co-axial with said shaft and carrying said test piece and being supported upright from below and including a driving pin engaging said slot.

6. In an apparatus as claimed in claim 5, means for supporting the top of said mandrel, the top of said mandrel having an upwardly and outwardly tapering recess, and a vertically adjustable guide including a tapered pin which engages in said recess and thereby centers the top of said upright mandrel.

7. In an apparatus, as claimed in claim 1, together with, magnetic means operable for adjustably and releasably generating a magnetic field across said rule and disc periphery for rendering said rolling contact between said rule and disc slip-free.

8. In an apparatus for optical gear shape testing, in combination, a frame, a measuring carriage oppositely movable lengthwise on said frame, a slide oppositely movable transversely on said carriage, a focussing microscope vertically adjustably supported on said slide, an optical revolving table disposed on said frame including a hollow shaft fitted into said table, means operable for releasably coupling said shaft with said table for tied rotation, means actuable for removably supporting axially of said shaft a gear shaped test piece rotatable with said shaft, means operable for moving said carriage and said slide to position said focussing microscope, means operable for simulating between the optical axis of said focussing microscope and said test piece the involute movement of the latter comprising a rolling disc connected for rotation to said shaft and interchangeable for coordination with a value of the shape of said test piece, a straight rule supported by said carriage and being movable to abut against the periphery of said disc and operable for rolling contact therewith, in the abutment position, means operable for generating between said rule and said disc periphery a magnetic field to render said rolling contact slip-free, means actuable to change the magnitude of said magnetic field to increase and decrease, respectively, the attraction between said rule and disc periphery, and a projection microscope disposed opposite said focussing microscope and having therewith focal coincidence.

References Cited in the file of this patent

UNITED STATES PATENTS

| | | |
|---|---|---|
| 1,642,219 | Steinle | Sept. 13, 1927 |
| 1,761,260 | Gallasch | June 3, 1930 |
| 1,882,962 | Sawford | Oct. 18, 1932 |
| 2,025,215 | Munn | Dec. 24, 1935 |
| 2,063,474 | Try | Dec. 8, 1936 |
| 2,171,589 | Miller | Sept. 5, 1939 |
| 2,539,597 | Staples | Jan. 30, 1951 |
| 2,596,322 | Zumwalt | May 13, 1952 |
| 2,629,936 | Croustedt | Mar. 3, 1953 |

FOREIGN PATENTS

| | | |
|---|---|---|
| 102,652 | Great Britain | Dec. 21, 1916 |
| 618,927 | Germany | Sept. 19, 1935 |